United States Patent
Banschbach

(10) Patent No.: US 10,900,858 B2
(45) Date of Patent: Jan. 26, 2021

(54) METHOD AND DEVICE FOR LEAK TESTING AN INTERNAL COMBUSTION ENGINE

(71) Applicant: Bayerische Motoren Werke Aktiengesellschaft, Munich (DE)

(72) Inventor: Tim Banschbach, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 16/131,379

(22) Filed: Sep. 14, 2018

(65) Prior Publication Data
US 2019/0011323 A1    Jan. 10, 2019

Related U.S. Application Data

(63) Continuation of application No. PCT/EP2017/052682, filed on Feb. 8, 2017.

(30) Foreign Application Priority Data

Mar. 18, 2016  (DE) .......................... 10 2016 204 502

(51) Int. Cl.
*G01M 3/02* (2006.01)
*G01M 3/32* (2006.01)
*G01M 3/26* (2006.01)
*G01M 15/02* (2006.01)
*G01M 15/08* (2006.01)
*G01M 15/09* (2006.01)

(52) U.S. Cl.
CPC .............. *G01M 3/025* (2013.01); *G01M 3/26* (2013.01); *G01M 3/3272* (2013.01); *G01M 15/02* (2013.01); *G01M 15/08* (2013.01); *G01M 15/09* (2013.01)

(58) Field of Classification Search
CPC . G01M 3/025; G01M 15/00–04; G01M 15/08
USPC ..................................................... 166/250.08
See application file for complete search history.

(56) References Cited

U.S. PATENT DOCUMENTS

| | | | | |
|---|---|---|---|---|
| 3,973,429 A | * | 8/1976 | Durgan ................. | G01M 3/025 73/49.7 |
| 4,157,028 A | * | 6/1979 | Moffett, III ........... | G01M 13/00 73/49.7 |
| 4,602,504 A | * | 7/1986 | Barber .................. | G01M 3/022 138/89 |
| 4,706,482 A | * | 11/1987 | Barber .................. | G01M 3/022 138/89 |
| 5,372,031 A | * | 12/1994 | Harmand .............. | G01M 3/025 73/303 |

(Continued)

FOREIGN PATENT DOCUMENTS

DE    10 2013 209 786 B3    1/2014

OTHER PUBLICATIONS

Engine Leakdown Testing. (n. d.). Retrieved Feb. 13, 2015, from https://www.aa1car.com/library/leakdown.htm (Year: 2015).*

(Continued)

*Primary Examiner* — Alexander A Mercado
(74) *Attorney, Agent, or Firm* — Crowell & Moring LLP

(57) ABSTRACT

An internal combustion engine has an inner chamber including at least one combustion chamber and at least one exhaust gas outlet which is connected to a sealing element and which opens when the internal combustion engine is first started up.

11 Claims, 2 Drawing Sheets

(56) References Cited

U.S. PATENT DOCUMENTS

| | | | |
|---|---|---|---|
| 6,672,389 B1* | 1/2004 | Hinrichs | E21B 34/063 166/317 |
| 2004/0118566 A1* | 6/2004 | Krywitsky | E21B 34/063 166/317 |
| 2007/0157714 A1* | 7/2007 | Rankin | G01M 3/3236 73/114.56 |
| 2008/0000289 A1* | 1/2008 | Furuse | G01M 3/3236 73/46 |
| 2010/0095746 A1* | 4/2010 | Lund | G01M 3/025 73/40.7 |
| 2011/0259582 A1* | 10/2011 | Krywitsky | E21B 34/063 166/250.08 |
| 2012/0279282 A1* | 11/2012 | Williams | G01M 3/025 73/49.7 |
| 2013/0240203 A1* | 9/2013 | Frazier | E21B 33/134 166/193 |
| 2015/0276552 A1* | 10/2015 | Story | F01N 11/00 73/114.76 |
| 2016/0011070 A1* | 1/2016 | Marek | G01M 15/04 60/602 |
| 2016/0230509 A1* | 8/2016 | Lopez | E21B 41/00 |
| 2016/0363503 A1* | 12/2016 | Matsukawa | G01M 3/3272 |

OTHER PUBLICATIONS

International Search Report (PCT/ISA/220 & PCT/ISA/210) issued in PCT Application No. PCT/EP2017/052682 dated May 11, 2017 with English translation (seven pages).

German-language Written Opinion (PCT/ISA/237) issued in PCT Application No. PCT/EP2017/052682 dated May 11, 2017 (six pages).

\* cited by examiner

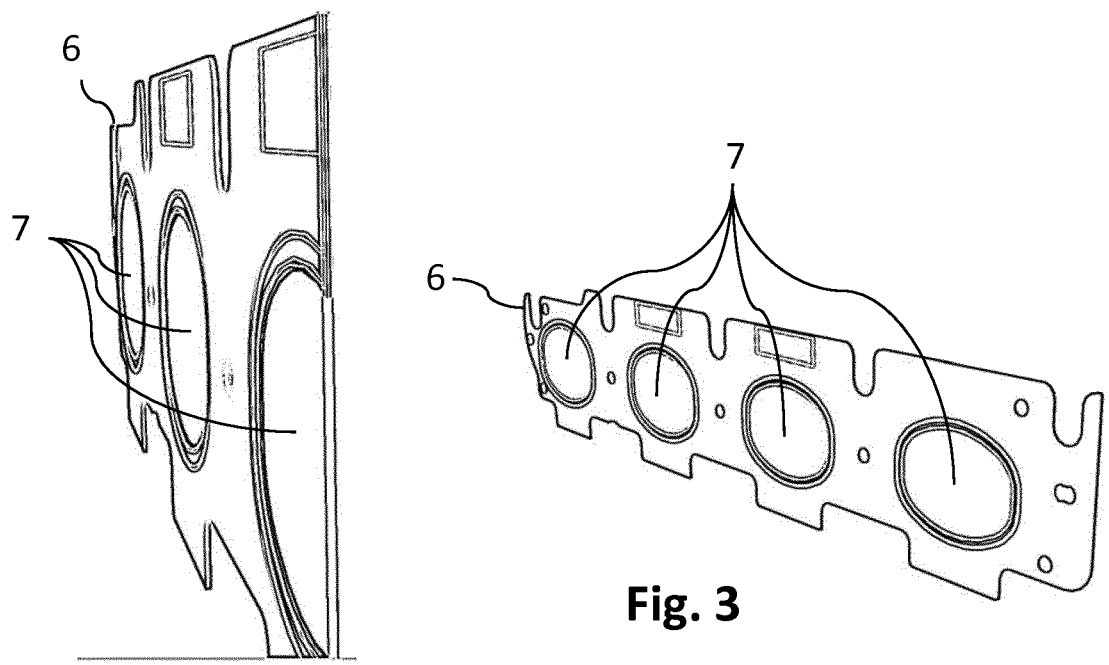
Fig. 2
Fig. 3
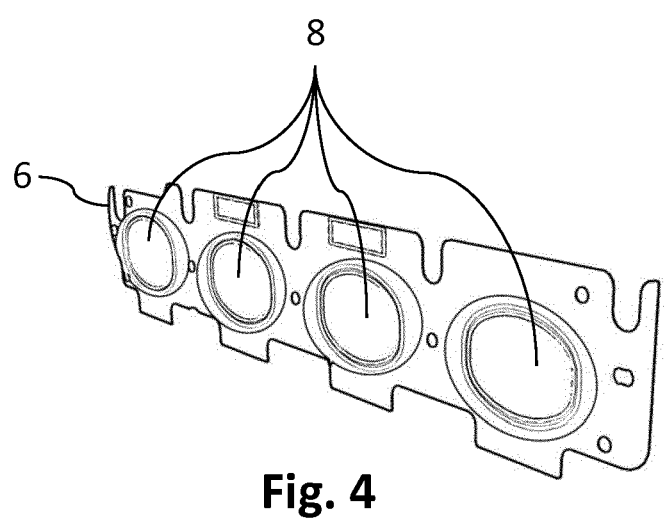
Fig. 4

METHOD AND DEVICE FOR LEAK TESTING AN INTERNAL COMBUSTION ENGINE

CROSS REFERENCE TO RELATED APPLICATIONS

This application is a continuation of PCT International Application No. PCT/EP2017/052682, filed Feb. 8, 2017, which claims priority under 35 U.S.C. § 119 from German Patent Application No. 10 2016 204 502.4, filed Mar. 18, 2016, the entire disclosures of which are herein expressly incorporated by reference.

BACKGROUND AND SUMMARY OF THE INVENTION

The invention relates to leak testing of the combustion chambers of an internal combustion engine. This leak testing preferably takes place during assembly of the internal combustion engine.

In internal combustion engines for motor vehicles, machines, aircraft and similar applications, it may be necessary to test the internal combustion engine for leaks following its assembly. A leak from the combustion chambers of the internal combustion engine can reduce the power that can be produced by the internal combustion engine and (particularly without aftertreatment) may lead to an uncontrolled emission of pollutants into the environment. Leaks in the area of the intake pipe can also lead to unfiltered air being drawn into the combustion chambers of the internal combustion engine. This may result in damage to components of the internal combustion engine. Equally, a leak in oil-ducting lines or their connections can lead in operation to a thermal event which adversely effects the operation of the internal combustion engine.

In known methods, a mass flow measuring method is used for such a leak test. The internal combustion engine is usually tested for leaks as a whole. In such a method all interconnected components and lines carrying clean air or exhaust gas are covered. These include, in particular, intake pipes, the combustion chambers of the internal combustion engine, exhaust pipes and exhaust emission control components. In particular, in such methods components such as exhaust turbochargers, for example, are tested for leaks together with other exhaust lines and components of the internal combustion engine. As a result, measures are usually necessary to seal off the exhaust turbocharger. For example, for such methods of leak testing an additional facing of flanges on an exhaust manifold and of cylinder head faces is necessary, because these components need to have a greater flatness and thereby an enhanced leak-tightness in order for the measurement to be performed. In addition, for such methods evenly coated seals are needed on an exhaust manifold. Special seals may furthermore be needed between a bearing block housing and a compressor or turbine housing.

All these measures for sealing off the exhaust turbocharger ultimately serve primarily to allow the leak test to be performed on the internal combustion engine. In subsequent operation of the internal combustion engine (in a motor vehicle, for example), the leak-tightness of an exhaust turbocharger, in particular, is not necessary (to the extent required for the leak testing). For this reason, these additional measures described above for sealing off the exhaust turbocharger are not necessary for use of the internal combustion engine in the motor vehicle and give rise to additional costs.

From the result of the leak testing of the internal combustion engine, an indication is usually inferred as to the correct fitting and correct functioning of all components and connections to be tested. A leak that is not crucial for correct functioning of the internal combustion engine may lead to the tested internal combustion engine being classed as faulty. The fact that the cause of the leak lies in the exhaust turbocharger (and hence in a component in which a leak is not relevant) can be detected by the methods described only through additional (costly) measures.

Proceeding from this, the object of the present invention is to solve or at least alleviate the technical problems described in relation to the prior art. The intention, in particular, is to present a method for leak testing an internal combustion engine which is confined to a limited physical area of the internal combustion engine.

These objects are achieved by a method for leak testing an internal combustion engine, as well as an internal combustion engine to be tested, according to embodiments of the invention. Further advantageous developments of the method and the internal combustion engine are described and claimed herein. The features individually specified in the patent claims can be combined with one another in any technologically suitable manner and may be supplemented by explanatory facts in the description, setting forth further design variants of the invention.

The method according to the invention for leak testing an internal combustion engine having an interior space comprising at least one combustion chamber and at least one exhaust gas outlet comprises at least the following steps:

a) closing of at least the one exhaust gas outlet by use of a sealing element;
b) admission of a pressure to the interior space for performing a leak test on the internal combustion engine; and
c) opening of the exhaust gas outlet on starting up the internal combustion engine for the first time.

The internal combustion engine is preferably a combustion engine such as a spark-ignition engine or a diesel engine of a motor vehicle, for example. The internal combustion engine preferably has one or more cylinders, in which fuel can be burned with air. Each of these cylinders forms one of the combustion chambers.

The interior space includes all hollow spaces in components and lines in the internal combustion engine which are connected to at least the one combustion chamber, or which in the operation of the internal combustion engine may be connected at least some of the time to at least the one combustion chamber (for example by the opening of valves). In particular, at least the one combustion chamber itself constitutes a part of the interior space. Furthermore, feed lines and outlet lines for clean air and/or for exhaust gas may, in particular, represent parts of the interior space. Such feed lines also include intake pipes and intake manifolds, for example. Such outlet lines also include exhaust pipes and exhaust manifolds, for example. Components such as exhaust turbochargers, air filters, exhaust gas aftertreatment devices (such as catalytic converters or particle filters, for example) or charge air coolers or recycled exhaust gas coolers, for example, may (at least in part) constitute parts of the interior space. Hollow spaces that are not connected to at least the one combustion chamber of the internal combustion engine generally do not count as part of the interior space. These include, for example, cooling ducts for coolant; hollow spaces which are provided in the engine block of an internal combustion engine in order to save weight and the like.

In conventional internal combustion engines the at least one combustion chamber is formed in the manner of a cylinder, in each of which a piston is arranged for producing mechanical energy. These pistons are connected by connecting rods to a crankshaft. Depending on the definition, a crankcase also counts as part of the interior space. The leak-tightness of the crankcase is then also covered by the leak test. The crankcase is connected via the piston rings (blowby) to the combustion chamber and to the space to be tested.

The exhaust gas outlet is at least a defined cross-sectional area, which forms a transition between the internal combustion engine and an exhaust system. The sealing element is situated in the area of the exhaust gas outlet (preferably in the defined cross-sectional area). The sealing element serves to seal off the interior space in order that the leak test can be performed effectively.

At least the one exhaust gas outlet is preferably an aperture of the combustion chambers though which exhaust gas can be led out of the combustion chambers. Each combustion chamber preferably has a separate exhaust gas outlet.

In a further preferred design variant all combustion chambers are connected to a connecting element for leading off the exhaust gases to the surroundings. In this case at least the one exhaust gas outlet may be a (common) exhaust gas outlet of the internal combustion engine, which forms a transition between two parts of the interior space. The connecting element is an exhaust manifold, for example. Ultimately it is purely a matter of definition whether and to what extent exhaust emission control components are still regarded as integral parts of the internal combustion engine arranged upstream of the exhaust gas outlet, or whether these components are seen as integral parts of an exhaust system downstream of the exhaust gas outlet in the direction of flow of the exhaust gas.

Closing at least the one exhaust gas outlet in step a) seals off the interior space. In particular, the closure separates components of an exhaust system, which are arranged downstream of the exhaust gas outlet, from the interior space of the internal combustion engine, so that they no longer count as parts of the interior space.

The sealing element is preferably designed to seal off the interior space up to a pressure differential of 0.2 bar at the exhaust gas outlet. For this purpose, the sealing element is preferably designed to withstand a pressure differential of up to 0.2 bar. In particular, the sealing element is preferably capable of withstanding a pressure differential of up to 0.5 bar.

An individual sealing element is preferably designed in such a way that in an internal combustion engine having a plurality of exhaust gas outlets (for example an exhaust gas outlet for each combustion chamber of the internal combustion engine) it is capable of sealing off all exhaust gas outlets of the internal combustion engine together. Alternatively, a separate sealing element is preferably provided for each exhaust gas outlet. In the case of an internal combustion engine having combustion chambers arranged and/or aligned in groups, such as a V-engine, for example, a separate sealing element is preferably provided for each group of combustion chambers. It is further preferable for at least the one sealing element to be arranged on at least one sealing plate, which can be placed over a plurality of exhaust gas outlets. In this case, the sealing plate preferably comprises an aperture, which is preferably closed by one of the sealing elements, for each exhaust gas outlet to be sealed.

If a pressure is admitted to the interior space in step b), this pressure acts equally on all confines of the interior space, because the pressure is propagated through the entire interior space. Should the interior space have a leak at one point or at multiple points, this can lead to a reduction in pressure inside the interior space. Such a reduction in pressure can be monitored and detected in step b). For this purpose, in one design variant a pressure measurement is preferably performed in step b). In a preferred design variant, however, a mass flow is measured, by means of which it is possible to detect leaks. In this case a mass flow, which continues to flow into the interior space from a pressure reservoir as a result of a fall in pressure in the interior space, is measured. It is especially preferred that in step b) the pressure in the interior space be measured by way of a pressure measuring instrument connected to the interior space. In the case of a mass flow measurement, a mass flow is measured on a flow duct through which air continues to flow into the interior space from the pressure reservoir. A mass flow sensor is used for this purpose. A variation in the pressure is preferably plotted over time, for example by use of a computer-controlled pressure measurement or a computer-logged mass flow measurement. In step b) a pressure in the range of 1.1-1.3 bar (absolute pressure including atmospheric pressure) is preferably used. Air is preferably used as medium for the leak test in step b). The pressure is preferably admitted to the interior space by a compressed air source connected to the interior space, particularly by an external, filled reservoir of defined pressure and volume.

In step c) at least one gas passage is preferably created in the sealing element. Alternatively, the sealing element is preferably removed completely. This can be done, for example, by removing a sealing element in the form of a sealing plate. The sealing element is removed in such a way that after performing step c) all exhaust gas outlets are fully opened. This is advantageous because an exhaust gas outlet that has not been fully opened inhibits the proper running of the internal combustion engine.

In a further embodiment of the method, the sealing element is a sealing film.

In a further embodiment of the method, the sealing element is designed to be destroyed if a pressure limit is exceeded.

The destructibility of the sealing element upon exceeding the pressure limit is preferably achieved by a thickness matched to the pressure limit and/or by the choice of material for the sealing element or sealing film. The destruction of the sealing element is preferably accomplished through tearing of the sealing element. The exceeding of the pressure limit may occur due, in particular, to the appearance of exhaust gas at the exhaust gas outlet. In this case the sealing element may be fitted during assembly of the internal combustion engine, the leaking testing may be performed after step b), and step c) is performed automatically by starting up the internal combustion engine for the first time, without the explicit need to initiate step c).

In a further embodiment of the method, the sealing element is designed in such a way that it is thermally degraded when a temperature limit is exceeded.

The sealing element or the sealing film is preferably formed with a material which has thermal characteristics matched to the temperature limit. Due to the fact that exhaust gas emerging from the combustion chambers has a higher temperature than the surroundings, the thermal degradation of the sealing element can be brought about, in particular, by exhaust gas from the internal combustion engine. Compared to the temperatures occurring in the leak test, the temperatures occurring in step b) of the leak test are low, so that the sealing element is not degraded in step b). In a manner similar to the embodiment of the method described above, in which exceeding of the pressure limit leads to tearing of the sealing film, in this embodiment of the method, also, starting up the internal combustion engine for the first time may suffice for the performance of step c).

Both in the destruction of the sealing element due to exceeding of the pressure limit and in the thermal degradation of the sealing element though exceeding of the temperature limit, the sealing element is preferably removed leaving no residue. A combination of the two possibilities (pressure-dependent destruction and thermal degradation) is also feasible. Thus, for example, the exceeding of the pressure limit may cause a first gas passage (for example a tear) in the sealing element, and the hot exhaust gas flowing through this may cause thermal degradation of the sealing element. It is especially preferred if the sealing element can be thermally degraded leaving no residue.

In a further embodiment of the method, the sealing element is formed at least in part with polyethylene.

The polyethylene sealing element is preferably a sealing film. This sealing film preferably has a film thickness in the range from 10 μm to 500 μm (micron), in particular in the range from 100 μm to 300 μm, for example 200 μm.

A sealing element formed with polyethylene may, as described above, tear due to exceeding of the pressure limit and/or be thermally degraded due to exceeding of the temperature limit. Polyethylene moreover has the advantage that the thermal and the mechanical characteristics can be influenced by material additives and thereby adapted to the desired temperature limit and/or the desired pressure limit. The sealing element is preferably formed entirely from polyethylene. A polyethylene sealing element can moreover be thermally degraded in the internal combustion engine and in the exhaust system without leaving any residue.

In a further embodiment of the method, the closing of the exhaust gas outlet is performed in step a) by inserting the sealing element between a block of the internal combustion engine and an exhaust manifold during assembly of the internal combustion engine.

In this embodiment of the method, in assembling an internal combustion engine having a plurality of exhaust gas outlets, a sealing film is preferably inserted between a block of the internal combustion engine and an exhaust manifold. It is also possible to use a sealing plate expressly intended for this purpose, in which sealing elements (preferably in the form of sealing films) are provided and arranged in such a way that these are positioned against the exhaust gas outlets when fitting the sealing plate.

The block of the internal combustion engine is preferably a crankcase. At least the one exhaust gas outlet is preferably formed as an outlet aperture of the block. The exhaust manifold is preferably connected to an exhaust turbocharger. The exhaust manifold is preferably designed to be connected to all exhaust gas outlets of the internal combustion engine. Alternatively, the exhaust manifold is preferably capable of connecting some of the exhaust gas outlets to one another. In that case it is preferable to provide multiple exhaust manifolds, so that each of the exhaust gas outlets can be connected to one of the exhaust manifolds.

If the sealing element is fitted when assembling the internal combustion engine and is designed to be opened when the internal combustion engine is started up for the first time, in particular, as described above, due to exceeding of the pressure limit or exceeding of the temperature limit, there is no need to remove the sealing element through an additional assembly step following the leak test. It is thereby possible to save costs.

If at least the one sealing element is arranged on a sealing plate, the sealing plate can more preferably be connected to the block by a screwed connection. A bolted connection is preferably used here, which at the same time may connect the block to the exhaust manifold, for example.

In a further embodiment of the method, the opening of the exhaust gas outlet in step c) occurs due to the arrival of exhaust gas on at least the one exhaust gas outlet on starting up the internal combustion engine for the first time.

Due to the fact that the exhaust gas has a higher temperature than the surroundings and an increased pressure, according to this embodiment the sealing element can be opened and/or degraded according to the two possibilities described above (exceeding of the temperature limit and exceeding of the pressure limit). Both conditions (the exceeding of a temperature limit and the exceeding of a pressure limit) usually occur on starting up the internal combustion engine for the first time.

The method for leak testing has been explained above with reference to the exhaust gas outlet of an internal combustion engine. The method can also be correspondingly used, however, for an intake air inlet of an internal combustion engine. Alternatively, or in addition to the exhaust gas outlet, in step a) an intake air inlet is closed by use of a sealing element, which corresponds to the sealing element for closing the exhaust gas outlet. The leak test in step b) can be performed exactly as described above. In step c) the inlet for intake air is opened as an alternative or addition to the opening of the exhaust gas outlet.

An internal combustion engine is furthermore presented, having an interior space comprising at least one combustion chamber and at least one exhaust gas outlet, which is closed by at least one sealing element, which disintegrates when the internal combustion engine is started up for the first time.

The internal combustion engine is preferably designed to be leak-tested according to a method as described above. The particular advantages and design features of the method described above are applicable and transferable to the internal combustion engine described. The same applies to the particular advantages and design features of the internal combustion engine described below, which are applicable and transferable to the method.

In a further embodiment of the internal combustion engine, an exhaust turbocharger is connected to the exhaust gas outlet.

This exhaust turbocharger is preferably an integral part of an exhaust system, which is connected to at least the one exhaust gas outlet of the internal combustion engine. The exhaust turbocharger is in particular preferably separated from the interior space of the internal combustion engine by the sealing element. This has the advantage, as described above, that in testing the leak-tightness of the internal combustion engine or the interior space it is possible to exclude the leak-tightness of the exhaust turbocharger. In an exhaust gas turbocharger leaks usually exist which are not relevant for the operation of the internal combustion engine but which, in the absence of any (additional) sealing of the turbocharger, are identified in a leak test as problematical leaks. Such (additional) sealing of the turbocharger is rendered obsolete by the method and the internal combustion engine described here.

The invention is preferably used in a motor vehicle having an internal combustion engine which is constructed as described above or is designed for performing the method described.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a schematic, perspective representation of a sealing plate.

FIG. 3 is a schematic, perspective representation of the sealing plate in FIG. 2.

FIG. 4 is a schematic representation of the sealing plate in FIGS. 2 and 3 with sealing elements.

DETAILED DESCRIPTION OF THE DRAWINGS

Figure 1:
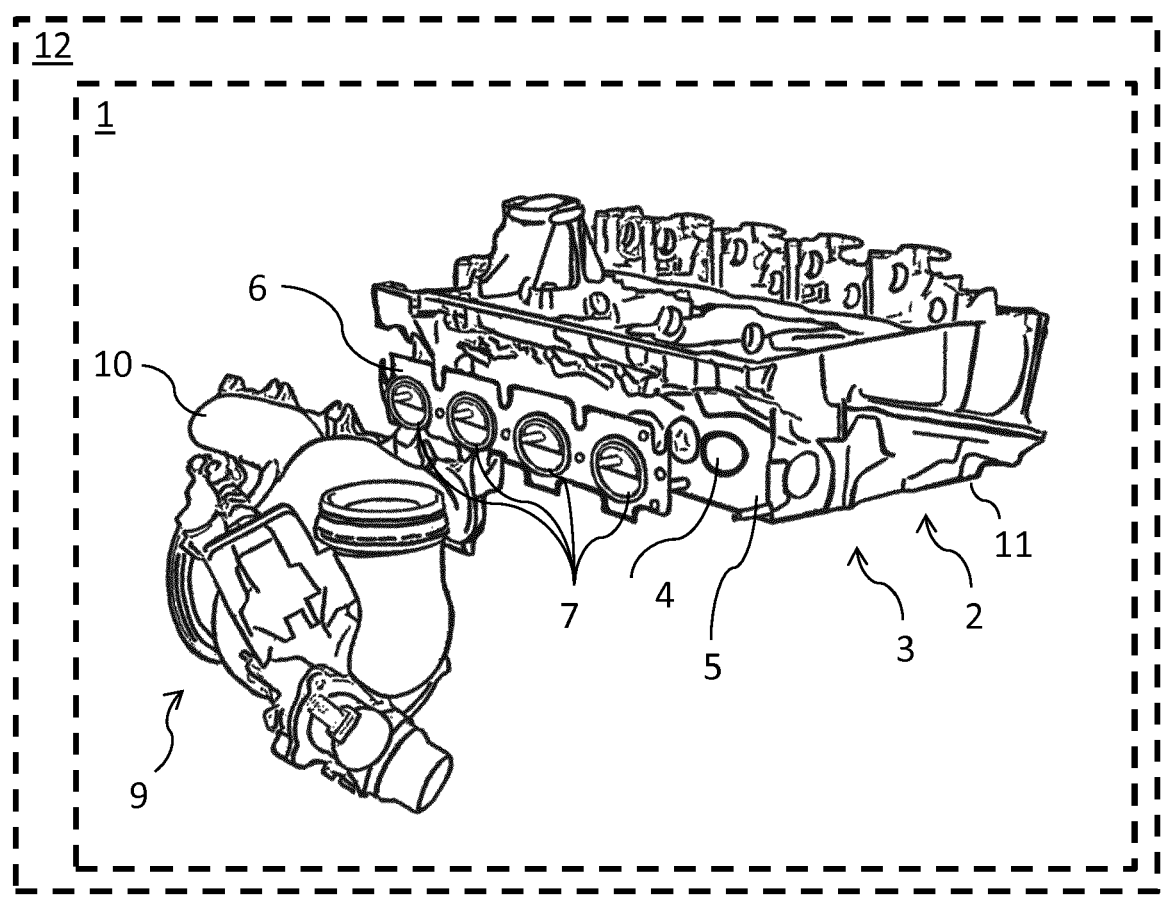
FIG. 1 is a schematic representation of a motor vehicle having an internal combustion engine with an interior space that can be limited by a sealing element.

FIG. 1 illustrates a motor vehicle 12 having an internal combustion engine 1. The internal combustion engine 1 includes a block 11 (here shown only in part) having an interior space 2 (likewise shown only in part), which in particular comprises four combustion chambers 3 and further components and lines, not represented. Each of the combustion chambers 3 has a separate exhaust gas outlet 4. A sealing plate 6 can be fitted to an exhaust gas outlet side 5 of the engine block 11. The sealing plate 6 has an aperture 7 for each of the exhaust gas outlets 4. Each of the apertures 7 can be closed by a separate sealing element (not shown here). An exhaust manifold 10, which is connected to an exhaust turbocharger 9, can be fitted to the exhaust gas outlet side 5. After fitting the exhaust manifold 10, the sealing plate 6 is inserted between the exhaust gas outlet side 5 of the block 11 and the exhaust manifold 10 of the turbocharger 9. In particular, provided that the apertures 7 of the sealing plate 6 are closed by sealing elements, the exhaust turbocharger 9 and the exhaust manifold 10 in particular do not form integral parts of the interior space 2 of the internal combustion engine 1.

FIG. 2 shows a part of a sealing plate 6. Apertures 7 are incorporated into the sealing plate 6. Each of the apertures 7 is situated opposite an exhaust gas outlet (not shown here) after fitting the sealing plate 6. In the representation shown, the apertures 7 are not closed by sealing elements.

FIG. 3 shows all of the sealing plate 6 in FIG. 2 and in another perspective representation. Here too, the apertures 7 are visible. In this representation the apertures 7 are not closed by sealing elements.

FIG. 4 shows the sealing plate 6 represented in the figures previously shown. Here, each of the apertures 7 is closed by a separate sealing element 8. The sealing elements 8 are designed as sealing films. The representation shown relates to a state that exists before starting up an internal combustion engine for the first time. The sealing elements 8 are thermally degraded in their entirety and/or destroyed by a pressure that occurs on starting up the internal combustion engine for the first time. After starting up the internal combustion engine for the first time, the sealing plate 6 is in the state without sealing elements 8 represented in FIG. 3.

LIST OF REFERENCE NUMERALS 1 internal combustion engine
2 interior space
3 combustion chamber
4 exhaust gas outlet
5 exhaust gas outlet side
6 sealing plate
7 aperture
8 sealing element
9 exhaust turbocharger
10 exhaust manifold
11 block
12 motor vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for leak testing an internal combustion engine having an interior space comprising at least one combustion chamber and at least one exhaust gas outlet during assembly of the internal combustion engine, the method comprising the steps of:
    a) closing the at least one exhaust gas outlet by inserting a sealing element between mating surfaces of the at least one exhaust gas outlet and an exhaust manifold that is connected to an exhaust turbocharger during the assembly of the internal combustion engine such that the exhaust manifold and the exhaust turbocharger form are sealed off from a part of the interior space of the internal combustion engine;
    b) admission of a pressure to the interior space and performing a leak test on the interior space by a pressure measurement or a mass flow measurement during the assembly of the internal combustion engine; and
    c) opening the exhaust gas outlet on starting up the internal combustion engine for a first time after the assembly of the internal combustion engine.

2. The method as claimed in claim 1, wherein the sealing element is a sealing film.

3. The method as claimed in claim 2, wherein the sealing element is designed such that it tears when a pressure limit is exceeded.

4. The method as claimed in claim 3, wherein the sealing element is designed such that it is thermally degraded when a temperature limit is exceeded.

5. The method as claimed in claim 4, wherein the sealing element is formed at least in part with polyethylene.

6. The method as claimed in claim 1, wherein the sealing element is designed such that it tears when a pressure limit is exceeded.

7. The method as claimed in claim 1, wherein the sealing element is designed such that it is thermally degraded when a temperature limit is exceeded.

8. The method as claimed in claim 1, wherein the sealing element is formed at least in part with polyethylene.

9. The method as claimed in claim 1, wherein the opening of the exhaust gas outlet in step c) occurs due to arrival of exhaust gas on at least the one exhaust gas outlet on starting up the internal combustion engine for the first time.

10. An internal combustion engine having an interior space, comprising:

at least one combustion chamber and at least one exhaust gas outlet, which is closed by a sealing element that is inserted between mating surfaces of the at least one exhaust gas outlet and an exhaust manifold that is connected to an exhaust turbocharger such that the exhaust manifold and the exhaust turbocharger are sealed off from a part of the interior space of the internal combustion engine, which sealing element disintegrates when the internal combustion engine is started up for a first time after assembly of the internal combustion engine.

11. A motor vehicle, comprising:
an internal combustion engine as claimed in claim 10.

\* \* \* \* \*